US011876877B2

(12) United States Patent
Forero et al.

(10) Patent No.: US 11,876,877 B2
(45) Date of Patent: Jan. 16, 2024

(54) REINFORCEMENT-LEARNING BASED QUEUE-MANAGEMENT METHOD FOR UNDERSEA NETWORKS

(71) Applicant: The United States of America as represented by the Secretary of the Navy, San Diego, CA (US)

(72) Inventors: Pedro Forero, San Diego, CA (US); Peng Zhang, San Diego, CA (US); Dusan Radosevic, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 18/190,204

(22) Filed: Mar. 27, 2023

(65) Prior Publication Data
US 2023/0319163 A1 Oct. 5, 2023

Related U.S. Application Data

(60) Provisional application No. 63/324,782, filed on Mar. 29, 2022.

(51) Int. Cl.
*G06F 15/16* (2006.01)
*H04L 67/61* (2022.01)
*H04L 47/22* (2022.01)
(52) U.S. Cl.
CPC .............. *H04L 67/61* (2022.05); *H04L 47/22* (2013.01)
(58) Field of Classification Search
CPC .................................. H04L 67/61; H04L 47/22
See application file for complete search history.

(56) References Cited

U.S. PATENT DOCUMENTS

| 8,265,091 B2 * | 9/2012 | Firoiu | H04L 47/50 370/235 |
| 10,873,533 B1 * | 12/2020 | Ismailsheriff | H04L 47/29 |
| 11,336,092 B2 * | 5/2022 | Diao | H02J 3/001 |
| 2004/0170186 A1 * | 9/2004 | Shao | H04L 47/22 370/413 |
| 2013/0268131 A1 * | 10/2013 | Venayagamoorthy | G05F 5/00 700/286 |

(Continued)

OTHER PUBLICATIONS

Fawaz et al., Deep Reinforcement Learning for Smart Queue Management, 2021, 14 pages (Year: 2021).*

*Primary Examiner* — Hieu T Hoang
(74) *Attorney, Agent, or Firm* — Naval Information Warfare Center, Pacific; Kyle Eppele; Evan Hastings

(57) ABSTRACT

A reinforcement-learning based queue-management method for undersea networks. In one embodiment, a computer-implemented method to shape traffic in a dynamic network, comprising measuring network states, classifying each of a plurality of packets into one of a plurality of traffic types based on quality-of-service requirements, defining a decision epoch interval, determining a policy with a plurality of neural networks and with a deep reinforcement learning agent that maximizes entropy-regularized long-term reward and produces a plurality of weighted fair-queuing weights based on an observation of the state of the queues at the decision epoch intervals, and using the policy to allocate predefined portions of the available transmission bandwidth across the plurality of traffic types by defining each type with a WFQ weight.

19 Claims, 3 Drawing Sheets

(56) References Cited

U.S. PATENT DOCUMENTS

| 2016/0014229 | A1* | 1/2016 | Seedorf | H04L 47/2475 |
| | | | | 370/235 |
| 2019/0140904 | A1* | 5/2019 | Huang | H04L 41/0894 |
| 2021/0112006 | A1* | 4/2021 | Francini | H04L 47/115 |

* cited by examiner

REINFORCEMENT-LEARNING BASED QUEUE-MANAGEMENT METHOD FOR UNDERSEA NETWORKS

CROSS-REFERENCE TO RELATED APPLICATION

This application is a non-provisional application claiming priority to U.S. Provisional Patent Application Ser. No. 63/324,782, filed on Mar. 29, 1922, and entitled "A Reinforcement-Learning Based Queue-Management Method for Undersea Networks," the entire content of which is fully incorporated by reference herein.

STATEMENT REGARDING FEDERALLY-SPONSORED RESEARCH AND DEVELOPMENT

The United States Government has ownership rights in this invention. Licensing inquiries may be directed to Office of Research and Technical Applications Naval Information Warfare Center Pacific, Code 72120, San Diego, CA, 92152; telephone (619) 553-5118; email: niwc_patent.fct@us.navy.mil, referencing Navy Case 210,896.

BACKGROUND

Future undersea networks require effective network resource management strategies able to support the increasing demand for undersea data. Due to the limited bandwidth and high delays characteristic of underwater acoustic communications, queueing management policies for in-transit data are expected to support the quality-of-service requirements that software applications need while helping to manage network congestion.

In the context of underwater acoustic networks where nodes have limited memory, energy, and bandwidth resources and compete for network access, traffic shaping and active queue management (AQM) policies can improve the efficiency with which network resources are used by controlling the traffic volumes and types flowing through the network. Queue management policies in underwater networks are challenging to implement effectively because of the variability of the undersea environment which can cause frequent link degradation and disconnects, and thus affects the bandwidth resources available to individual nodes, and furthermore to the entire network. Although deploying large memory buffers with each network node could mitigate the need for AQM policies, their impact on computational requirements for managing individual queues can be unnecessary. Moreover, nonchalant usage of large memory buffers can lead to bufferbloat which negatively impacts time-sensitive data traffic. Likewise, the use of fair queueing (FQ) scheduling policies can lead to suboptimal use of network-bandwidth resources if the policies are not adapted to dynamically respond to changes in the level or resources available to the network.

SUMMARY

According to illustrative embodiments, a computer-implemented method to shape traffic in a dynamic network, comprising measuring network states comprising a queue-size history, a measure of QoS mapped to a queue status metric, a measure of congestion, and an available transmission bandwidth; classifying each of a plurality of packets into one of a plurality of traffic types based on quality-of-service (QoS) requirements; defining a decision epoch interval; determining a policy with a plurality of neural networks and with a deep reinforcement learning agent that maximizes entropy-regularized long-term reward and produces a plurality of weighted fair-queuing (WFQ) weights based on an observation of the state of the queues at the decision epoch intervals; and using the policy to allocate predefined portions of the available transmission bandwidth across the plurality of traffic types by defining each type with a WFQ weight.

Additionally, a non-transitory computer-readable storage medium storing instructions that are executable by at least one hardware device processor to shape traffic in a dynamic network, comprising measuring network states comprising a queue-size history, a measure of QoS mapped to a queue status metric, a measure of congestion, and an available transmission bandwidth; classifying each of a plurality of packets into one of a plurality of traffic types based on quality-of-service (QoS) requirements; defining a decision epoch interval; determining a policy with a plurality of neural networks and with a deep reinforcement learning agent that maximizes entropy-regularized long-term reward and produces a plurality of weighted fair-queuing (WFQ) weights based on an observation of the state of the queues at the decision epoch intervals; and using the policy to allocate predefined portions of the available transmission bandwidth across the plurality of traffic types by defining each type with a WFQ weight.

Additionally, a router, comprising: a plurality of software applications, a transport layer further comprising a congestion control; a network layer, further comprising: a router configured to receive a plurality of packets for transmission, a packet classifier configured to assign each of the plurality of packets to one of a plurality of queues, the plurality of queues configured to run an active queue management (AQM) policy, wherein the AQM assigns weights to each of the plurality of packets to accommodate quality of service and dynamic network requirements, a weighted fair-queuing (WFQ) policy configured to select packets to transmit to a data link layer, wherein the WFQ policy is formed with a plurality of neural networks and with a deep reinforcement learning agent to allocate predefined portions of the available transmission bandwidth across the plurality of traffic types by defining each type with a WFQ weight, and a plurality of Control Delay policies configured to drop a plurality of packets to control congestion; a data link layer configured to receiving outgoing traffic; and a physical layer configured to transmit outgoing traffic and receive incoming traffic.

It is an object to provide a queue management method for in-transit data inspired by weighted-fair queueing that offers numerous benefits, including: (i) the use of the history of queue occupancy levels and queue-delay violations to dynamically define a weighted fair-queuing policy (WFQ); (ii) the use of indicators of the network congestion experienced by each queue to drive the selection the WFQ policy; and (iii), a deep reinforcement learning framework that can be used in tandem with an active queue management algorithm to manage network traffic with different priorities and requirements.

In one embodiment, this policy dynamically may allocate portions of the available transmission bandwidth to different traffic types flowing through the queues. The policy may further comprise user-defined traffic prioritization, queueing-delay requirements, and the history of queue-occupancy levels to define the allocation of bandwidth. Additionally, this disclosure may use soft actor-critic, a type of deep reinforcement learning algorithm, to train a learning agent. Moreover, we may include an active-queue management policy tuned to identify congestion for individual traffic types via the instantaneous queue sojourn-time experienced by packets. The active-queue management policy may interact with the learning agent and with the congestion-control protocol used by the source to mitigate congestion.

It is an object to overcome the limitations of the prior art.

These, as well as other components, steps, features, objects, benefits, and advantages, will now become clear from a review of the following detailed description of illustrative embodiments, the accompanying drawings, and the claims.

BRIEF DESCRIPTION OF THE DRAWINGS

The accompanying drawings, which are incorporated in and form a part of the specification, illustrate example embodiments and, together with the description, serve to explain the principles of the invention. Throughout the several views, like elements are referenced using like references. The elements in the figures are not drawn to scale and some dimensions are exaggerated for clarity. In the drawings.

DETAILED DESCRIPTION OF EMBODIMENTS

The disclosed apparatus, system, and/or method below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other apparatus, system, and/or method described herein as will be understood by one of ordinary skill in the art unless otherwise stated specifically.

References in the present disclosure to "one embodiment," "an embodiment," or any variation thereof, means that a particular element, feature, structure, or characteristic described in connection with the embodiments is included in at least one embodiment. The appearances of the phrases "in one embodiment," "in some embodiments," and "in other embodiments" in various places in the present disclosure are not necessarily all referring to the same embodiment or the same set of embodiments.

As used herein, the terms "comprises," "comprising," "includes," "including," "has," "having," or any variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Figure 1:
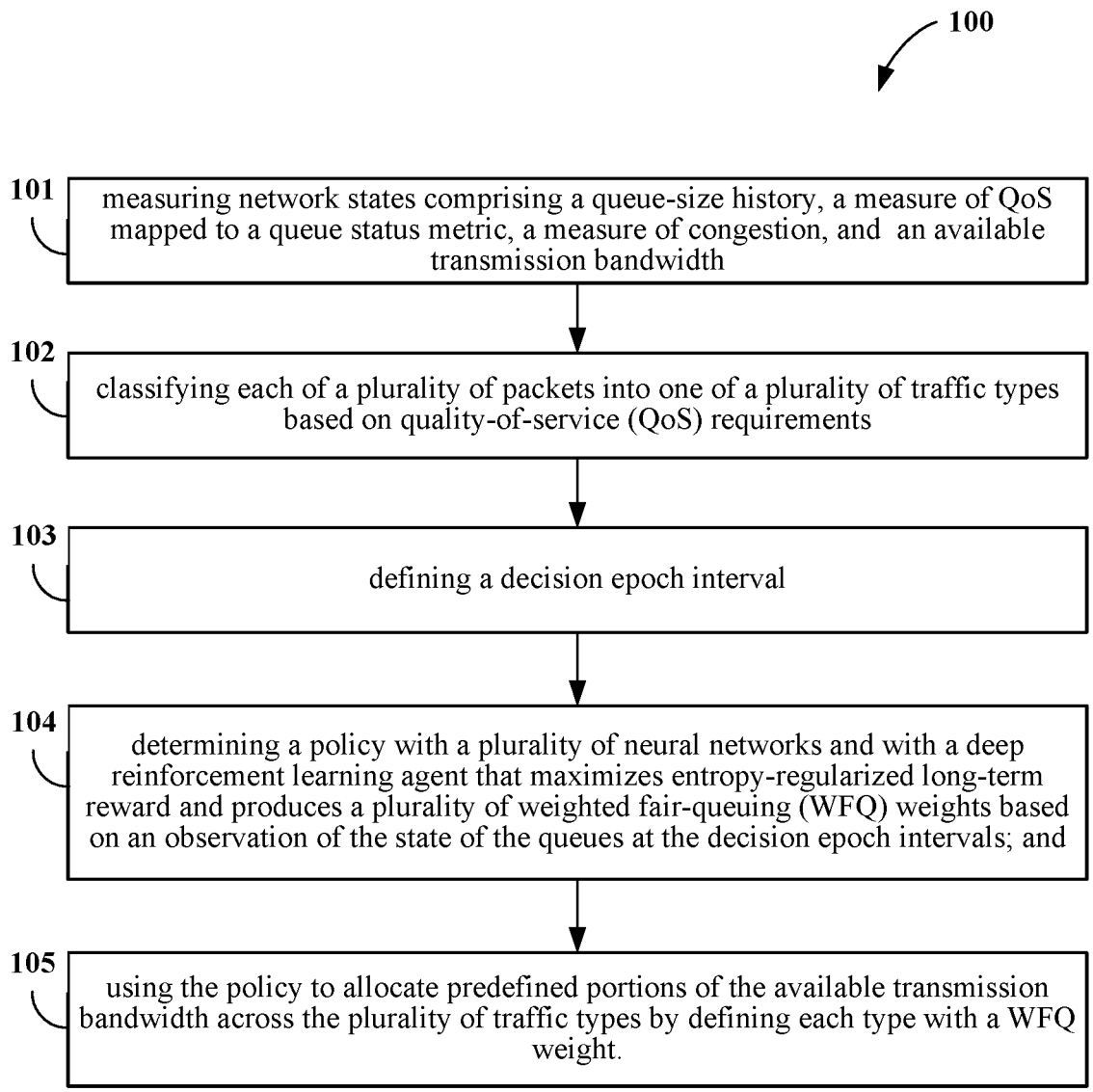
FIG. 1 is a block-diagram illustration of a computer-implemented method to shape traffic in a network.

Additionally, use of words such as "the," "a," or "an" are employed to describe elements and components of the embodiments herein; this is done merely for grammatical reasons and to conform to idiomatic English. This detailed description should be read to include one or at least one, and the singular also includes the plural unless it is clearly indicated otherwise. FIG. 1 is a block-diagram illustration of a computer-implemented method to shape traffic in a dynamic network comprising measuring network states comprising a queue-size history, a measure of QoS mapped to a queue status metric, a measure of congestion, and an available transmission bandwidth 101; classifying each of a plurality of packets into one of a plurality traffic types based on quality-of-service (QoS) requirements 102; defining a decision epoch interval 103; determining a policy with a plurality of neural networks and with a deep reinforcement learning agent that maximizes entropy-regularized long-term reward and produces a plurality of weighted fair-queuing (WFQ) weights based on an observation of the state of the queues at the decision epoch intervals 104; and using the policy to allocate predefined portions of the available transmission bandwidth across the plurality of traffic types by defining each type with a WFQ weight 105.

The computer-implemented method to actively manage dynamic networks of claim 1, may also include continuously balancing the policy at successive decision epoch intervals.

The method illustrated in FIG. 1 may be used in an intermittently connected and lossy networks, such as an undersea acoustic network, with N E N nodes. Flows traversing node n may be categorized as endogenous or exogenous based on whether they are generated at n or at a different network node. In one example, let $F_n$ denote the set of unicast flows traversing node n and being generated elsewhere, with n∈{1, . . . , N}, and Sn denote the set of unicast flows originating at node n. Packets that belong to flows whose destination node is n are passed directly to their application destination. All outgoing packets may be classified to one of D traffic classes prior to being placed in the queue that corresponds to the packet's assigned class. Each node n may use a collection of D, finite-size first-input first-output (FIFO) queues $Q_n := \{Q_{n,d}\}^D_{d=1}$, where $Q_{n,d}$ denotes the size of queue $Q_{n,d}$, to store packets prior to routing them to their next hop on their path to their corresponding flow destination. Queues may have user-defined priority levels defined as $\{\kappa_1, \ldots, \kappa_D\}$, where $0 < \kappa_d \in R$ defines the priority value. Packets in $Q_{n,d}$ are considered to be higher priority than those in $Q_{n,d0}$ if $\kappa_d > \kappa_{d0}$, with d, d0∈{1, . . . , D}. Additionally, each queue has an associated delay target value $0 < \Delta_{n,d} \in R$ which indicates the user's queueing sojourn-time preference for a traffic type d at node n. Enqueued packets remain in their assigned queue until they are dequeued and passed on to the Data Link layer to be scheduled for transmission. A WFQ policy defined by the weights w (τ) n:=[w (τ) n,1, . . . , w (τ) n,D]0∈R D, with w (τ) n,d≥0, ∀d, [•] 0 denoting the transpose operator and τ∈N denoting a discrete time index, is used to allocate the available channel bandwidth across all traffic types. The length of the interval [τ, τ+1] defines how long a specific WFQ policy is used. Each queue maintains two estimates of the sojourn time of packets in the queue: (i) δ (τ) n,d the average sojourn time of all packets dequeued from Qn,d during epoch τ, and (ii) the minimum sojourn time experienced for packets being dequeued. While in epoch τ, w (τ) n defines the number of packets chosen from each non-empty queue in Qn based on the available channel bandwidth. The Data Link layer updates and advertises its available-channel-bandwidth estimate periodically, at times indexed by t∈N. Times indexed by t occur at a frequency higher than that of those index by τ, and are reset to zero when T increases. The number of packets from $Q_{n,d}$ to be dequeued during epoch (τ, t) is $$M_{n,d}^{(\tau,t)} = \begin{cases} \dfrac{w_{n,d}^{(\tau)} M_n^{(\tau,t)}}{\sum_{d'=1}^{D} w_{n,d'}^{(\tau)}, 1(|q_{n,d'}^{(\tau,t)}| > 0)} & |q_{n,d}^{(\tau,t)}| > 0 \\ 0 & |q_{n,d}^{(\tau,t)}| = 0 \end{cases}, \forall d \quad (1)$$

where $M_n^{(\tau,t)} M_n^{(\tau,t)}$ denotes the number of packets that can be received by the Data Link layer during epoch $(\tau, t)$ and $q_{n,d}^{(\tau,t)}$ the occupancy in packets of $Q_{n,d}$ at $(\tau, t)$. Packets that are not successfully transmitted prior to the start of t+1 are maintained by the Data Link layer. These packets will continue to be part of the set of Mn packets to be transmitted during the t+1 period and will remain in the Data Link transmission queue until the end of their time-to-live period. Queues use a drop-tail policy to handle overflow. When a queue is full, new packet allocations made by the classifier will be dropped. The total number of packets dropped per queue d and epoch $\tau$, namely $\xi_{n,d}^{(\tau)} \in N$, is maintained. Additionally, each queue implements a modified version of Control Delay (CoDel) as its AQM policy. CoDel operates on a per-packet basis as packets are being dequeued by using the minimal sojourn time of packets in the queue as an indicator of congestion. Rather than dropping a marked packet, our CoDel implementation generates a notification message that is sent back to the source of the flow. This notification is intended for the congestion control protocol used by the flow source and serves as an indicator of congestion at node n. The total number of packets marked by our CoDel implementations during the $\tau$-th epoch is denoted by $\mu_{n,d}^{(\tau)}$. Given a series of observations of the queue occupancy levels, the sojourn time experienced by the packets, $M_n^{(\tau,t)}$ and the estimated level of congestion experienced at each queues, we seek to develop a policy that enables an agent to dynamically select $w_n^{(\tau)}$. The agent is expected to favor policies that satisfy the traffic prioritization defined by $\{\kappa_1, \ldots, \kappa_D\}$, control the queue delay violations experienced by packets in the queues and help mitigate network congestion via bandwidth allocations that reflect traffic congestion as perceived by CoDel.

Weighted-fair queuing (WFQ) is a packet scheduling policy that allocates predefined portions of the available bandwidth across traffic types. The bandwidth allocation is, thus, dynamic in the sense that it adapts to the true available bandwidth while maintaining a fair bandwidth allocation across traffic types. Typically, the WFQ policy is kept fixed and independent of the available bandwidth and perceived network congestion. Different from wired and radio frequency (RF) networks in which transmission delays are small and somewhat constant, undersea acoustic networks are characterized with large transmission delays and significant variability. Furthermore, the available transmission bandwidth can change significantly in complex spatiotemporal patterns due to the characteristics of the acoustics communications environment. In this context and given the limited transport layer and congestion control options available for undersea acoustic networks, it is prudent to consider whether packet scheduling policies can be constructed so that they contribute towards mitigating network congestion.

A policy may be defined as a mapping from state values to WFQ weights embodied in a plurality of deep neural network parameters learned via a reinforcement learning algorithm. Furthermore, reinforcement learning (RL) is a machine learning method in which an agent learns decision-making policies through interactions with an environment. In this learning paradigm example, an agent learns a decision-making policy based on the observed state of the environment and a reward associated with the agent's previous decision. RL has shown state-of-the-art results in a variety of decision-making tasks including dynamic network access, data rate control, and wireless caching. In the context of AQM and data scheduling, an RL approach to manage the data link layer by choosing how many packets to send thru the channel and the type of error correction code to use has been proposed. This approach enables the transmitter to choose when to send probing packets to update its estimate of the bit error rate probability characterizing the channel.

Moreover, the method described in FIG. 1 comprises a queue management policy developed using deep reinforcement learning (DRL). As packets arrive to the transmitting node or router, packet scheduler assigns specific queues based on the Quality of service (QoS) requirements. Different queue management strategies can be used for queue management, depending on the network and message requirements. As an example, a soft actor-critic (SAC) algorithm may be used in the instant disclosure, described herein, to optimize a stochastic policy for managing packet queues. SAC offers advantages, including: (i) it is able to work with continuous state and action spaces, (ii) it offers improved stability during training by directly considering the entropy of the policy as a regularizer, and (iii) it learns a stochastic policy which mitigates local-minima-convergence issues and encourages exploration. As an off-policy learning algorithm, SAC is also able to use past experience during training via a replay buffer. Our proposed learning algorithm may use, but is not limited to, the queue-size history, a measure of QoS mapped to a queue status metric, a measure of congestion developed locally based on metrics collected from our AQM policy, and the advertised available transmission bandwidth to define a dynamic WFQ policy that allocates bandwidth resources to queues. Historical data, summarized via averages of queue status metrics over a predefined decision-epoch period, may be used to avoid spurious variability caused by the traffic and environment dynamics. Although the instant policy development process may be decoupled from the packet scheduling mechanism, information about network resource availability reported by the media access control (MAC) protocol via the Data Link layer may be considered by our DRL approach to define the queue management policy. Thus, this disclosure may be used in concert with a variety of MAC protocol implementations. The DRL policy may be responsible for selecting the volume of data, i.e., packets, from each traffic type that can be sent to the MAC layer while trying to satisfy traffic QoS requirements and mitigate congestion, but is not so limited. The proposed DRL framework may accommodate a variety of QoS metrics quantified via queue status variables. Although one embodiment of this work uses mean queueing delay as the QoS metric of choice, other queue related metrics, such as minimum queue delay, jitter, and flow start-up time, may also be used.

Figure 2:
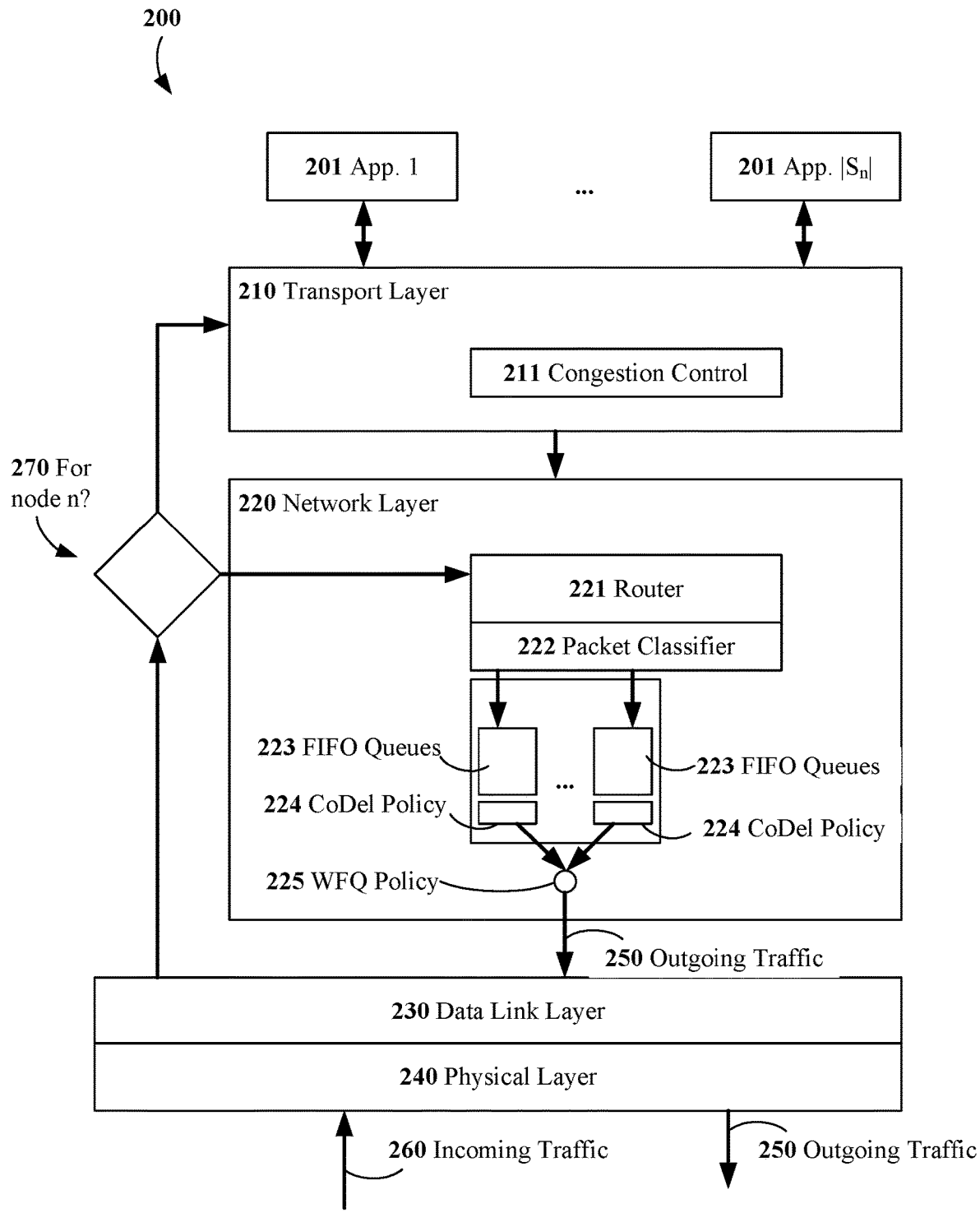
FIG. 2 is an illustration of a generic router utilizing a reinforcement-learning based queue-management method for networks.

FIG. 2 is an illustration of a generic routing node 200 comprising plurality of applications 201, congestion control 211 within a transport layer 210; router 221, packet classifier 222, a plurality of FIFO queues 223, a plurality of Controlled Delay (CoDel) policies 224, WFQ policy 225 within a network layer 220; a data link layer 230; a physical layer 240; outgoing traffic 260; incoming traffic 250; and a "For node n?" decision block 270. The diagram also depicts the flow of incoming and outgoing network traffic handled by the node. The ensuing section introduces in detail the decision-making problem faced by the learning agent that manages the traffic shaping policy at the node.

The example environment used in FIG. 2 is models an example environment for the method shown in FIG. 1 in which the node may execute multiple software applications simultaneously. Software applications 201 generate data traffic that is modeled as concurrent unicast flows. Flows can have specific QoS requirements, or have no QoS requirements in which case they are referred to as best-effort traffic. Based on the QoS requirements, traffic can be partitioned to Q different traffic classes, with multiple unicast flows belonging to a given class. The Transport Layer 220 controls the packet rate allocated to each flow via a congestion control protocol. The instant congestion control protocol-model may be inspired by the Transport Control Protocol (TCP). Similarly to TCP, it implements slow-start and congestion-avoidance phases as mechanisms to handle different interaction stages with the network. Despite its similarity to TCP, the instant congestion protocol model 211 may rely on tail-dropout and congestion notifications generated by intermediate nodes to adjust the size of its transmission window. Similarly to TCP, lack of end-to-end acknowledgement messages can be used as a congestion indicator. However, their use is not necessary and can, thus, be avoided in situations in which the corresponding traffic overhead cannot be supported by the network resources available. Each node in the network may be furnished with packet routing and scheduling capabilities. Prior to being routed, i.e., prior to selecting an entry of the forwarding table defining where the packet will be sent next, a packet classifier is used to place packets into one of D queues with each queue corresponding to a traffic class. The packet classifier 222 monitors both traffic generated at the node and traffic being forwarded from neighboring nodes. A traffic shaping algorithm is then used to manage how the bandwidth available to the node for routing packets is allocated among all traffic classes. The traffic-shaping profile may be managed by a dynamic WFQ protocol that periodically updates its weights to accommodate the QoS requirements while adapting to the dynamics of the traffic and bandwidth availability. The queue size is considered finite and fixed. When any queue becomes full, a tail-drop policy may be used to manage new packets arriving to the router. Additionally, each queue implements an AQM policy that proactively flags congestion to the sources of the flows traversing the queue. Our approach implements a modified version of the CoDel 224 algorithm at each queue. Rather than dropping packets, a congestion notification message is sent to the source whenever CoDel 224 flags a packet. Likewise, packet drops caused by the tail-drop policy trigger the generation of congestion notifications. Once packets are routed, they are passed to the Data Link layer 230 which is responsible for scheduling them for transmission. Packets are enqueued at the Data Link layer 230 until they can be transmitted through the channel as dictated by the MAC protocol. Thus, the amount of queue space that becomes available for the traffic shaping algorithm for allocating changes according to the channel dynamics and the behavior of other nodes attempting to use the channel.

Nodes responsible for shaping the network traffic via one embodiment of the instant WFQ policy are furnished with a decision-making agent that periodically defines the WFQ policy via $w^{(\tau)}$. The goal of each agent is to define a policy that maximizes the local queue data throughput, reduces network congestion, and provides the QoS requirements and prioritization defined for each traffic class. The agent updates the WFQ policy periodically based on a schedule that for the purpose of this work is considered to be fixed. The ensuing sections model the decision-making process executed by each agent within an infinite time-horizon Markov Decision Process (MDP) framework and introduce SAC as the reinforcement learning algorithm used by the agent to learn the policy.

Figure 3:
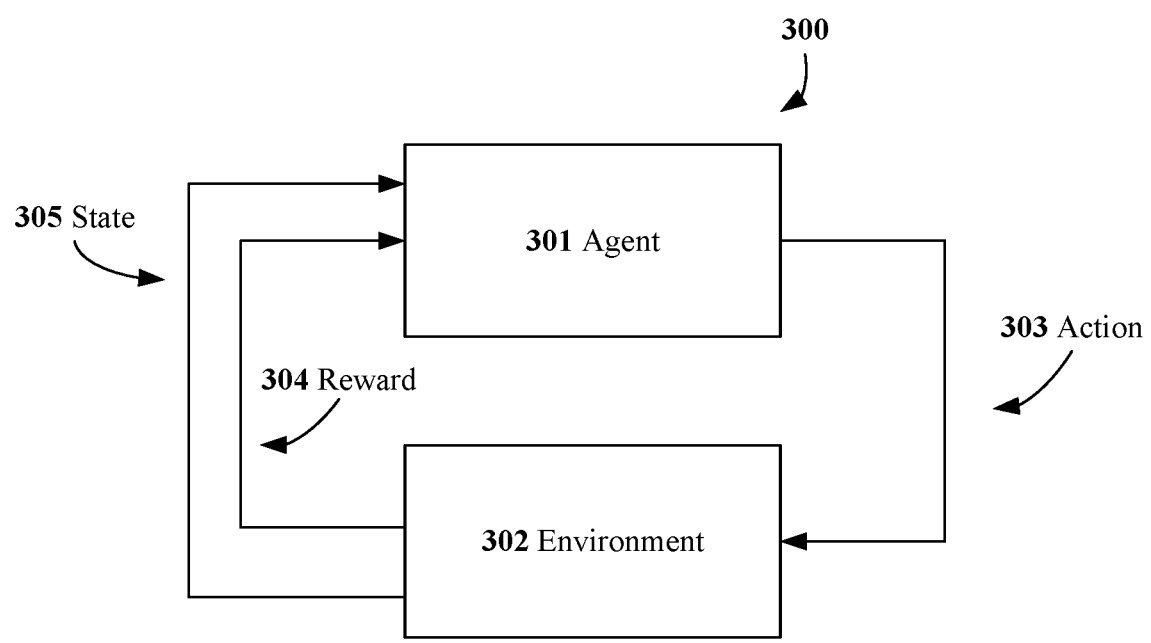
FIG. 3 is a block-diagram illustration the execution framework of reinforcement learning.

FIG. 3 is a block-diagram illustration the typical evolution of an RL method 300 comprising an agent 301, environment 302, action 303, reward 304, and state 305. The diagram 300 represents a framework used to learn the WFQ policies utilized in the active queue management described in FIG. 1. The agent 301 applies an action $(a^{(\tau)})$ comprising weighted-fair queueing weights to the environment 302. The environment 302 may be the router node networking stack. The environment 302 may then provide a reward $(r^{(\tau)})$ 304 and state $(S^{(\tau)})$ 305 back to the agent 301. The reward 304 and state 305 feedback from the environment 302 allow the agent 301 to iterate for another action.

In FIG. 3, the decision-making process of the agent 301 responsible for the selection of $w_n^{(\tau)}$ is modeled 300. The underlying MDP 300 characterizes how the environment 302 evolves as the agent 301 interacts with it. At a given decision epoch $\tau$ and with S (A) denoting the state (action) space, the agent 301 observes a representation of the state $s(\tau) \in S$ and based on it executes an action $a(\tau) \in A$. Then, the agent 301 receives a reward 304 $r(\tau+1) \in R$ and the environment 302 evolves to a new state $s(\tau+1) \in S$. The dynamics of the environment 302 are characterized by the set of transition probabilities P of the form:

$$P(s',r'|s,a) Pr\{s^{(\tau+1)}=s', r'=r^{(\tau+1)}|s^{(\tau)}=s, a^{(\tau)}=a\} \quad (2)$$

with s', s∈S, r'∈R and a∈A, which define the probability of the system to transition to s 0 and receive a reward r' given that the system is currently in s and the agent takes action a. In our case, we consider only the sequential nature of the decision making process to be relevant. The time in-between decision epochs is considered to be a variable parameter that does not impact the policy learned by the agent. The time variability stems from the variable number of packets that are chosen to be dequeued at each decision epoch based on $M_n^{(\tau)} := M_n^{(\tau,0)}$. From that perspective, $\tau$ can be chosen from a fixed schedule based on a predefined number of channel bandwidth advertisements announced by the Data Link layer 230. Thus, the exact time in between decision epochs for the agent depends on $M_n^{(\tau)}$ and the speed with which packets can be dequeued. Each element of the MDP that describes the decision making process of agent that manages the WFQ policy 225 and the dynamics of the environment are described next.

1) State Space: Let $q_{n,d}^{(\tau)} := q_{n,d}^{(\tau,0)} \in [0, \overline{Q}_{n,d}]$, $\Delta_{n,d}$ the queueing sojourn-time requirement for $Q_{n,d}$, $\delta_{n,d}^{(\tau)}$ the measured mean sojourn time for packets in $Q_{n,d}$, and $v_{n,d}^{(\tau)} := (\delta_{n,d}^{(\tau)} \delta(\tau) n, d-\Delta_{n,d})+$, with $(\cdot)+:=\max\{0, \cdot\}$, the violation of the sojourn-time requirement at $Q_{n,d}$. The state observed by the agent is defined by the tuple $s^{(\tau)} := (Q_n^{(\tau)}, Y_n^{(\tau)}, m_n^{(\tau)}, \lambda_n^{(\tau)}$, where $Q_n^{(\tau)} := [q(\tau) n, \ldots, q_n^{(\tau-\tau w)}] \in R^{D \times \tau W}$ denotes the history of queue sizes over a window of size $\tau w \in NN$, $q_n^{(\tau)} := [q_{n,1}^{(\tau)}, \ldots, q_{n,D}^{(\tau)}]' 0 \in R^D$, $Y_n^{(\tau)} := [v_n^{(\tau)}, \ldots, v_n^{(\tau-\tau w)}] \in R^{D \times \tau w}$ denotes the history of queue delay violations, $v_n^{(\tau)} := [v_{n,1}^{(\tau)} 1, \ldots, v_{n,D}^{(\tau)}] 0 \in R^D$, $m_n^{(\tau)} := [M_n^{(\tau)}, \ldots, M_n^{(\tau-\tau W)}]' \in R$ $\tau w$, and $\lambda_n^{(\tau)} := [\lambda_1^{\tau}, \ldots \lambda_D^{\tau}] 0 \in N$ D, where $\lambda(\tau)$ d is a counter that tracks the number of packets marked by the CoDel policy 324 for $Q_{n,d}$ since the last decision epoch, i.e., those packets marked by CoDel 324 in the interval $(\tau-1, \tau]$. Although our state definition captures explicitly the queue occupancy and mean-delay-violation history over the last Tw decision epochs in this embodiment, from the perspective of the MDP 300 the transition probabilities depend on $Q_n^{(\tau)}$ and $Y_n^{(\tau)}$ only. Thus, the Markovianity of the MDP 300 is maintained.

2) Action Space: At the beginning of each decision epoch the agent selects the weights w ($\tau$) n=: a ($\tau$) from the set $W_n^{(\tau)}:=\{w_n \in R_D: w_{n,d} \geq 0, w_{n,d}=0 \text{ if } q_{d,n}^{(\tau)}=0, \Sigma_{d=1}^D w_{n,d}=1\}$ which is a simplex set that assigns a zero weight to an empty queue. In this case A is a continuous valued space.

3) Transition Function: The evolution of the MDP 300 is characterized by the enqueueing and dequeueing processes at each queue which can be modeled as a stochastic process defining P. These processes capture dynamics including: (i) the packet arrival process associated with exogenous and endogenous traffic, and (ii) the packet departure process dependency on the space availability advertised by the Data Link layer. Per queue d∈ {1, . . . , D}, the transition function is given by:

$$q_{n,d}^{(\tau+1)}=\min\{\max\{0, q_{n,d}^{(\tau)} - w_{n,d}^{(\tau)} M_n^{(\tau)}\} A_{n,d}^{(\tau)}, \overline{Q}_{n,d}\} \quad (3)$$

where $A_{n,d}^{(\tau)}$ and $M_n^{(\tau)}$ are considered random variables corresponding to the packet arrivals to queue d in the interval [$\tau$, $\tau$+1) and the number of packets that can be received by the Data Link layer during the interval [$\tau$, $\tau$+1), respectively. Note that (3) assumes that only packets enqueue during the interval [$\tau$−1, $\tau$) can be considered to be transmitted at $\tau$. The packet arrival process models traffic being routed from neighboring nodes (exogenous traffic) and traffic generated locally at the node (endogenous traffic). The $A_{n,d}^{(\tau)}$s are a function of the congestion control algorithm implemented at the flow source and its interactions with the AQM policies implemented per node. A closed-form equation for the transition function of $Y_n^{(\tau)}$ and $\lambda_n^{(\tau)}$ cannot be easily obtained due to their dependency on the traffic generation pattern, the network topology, the behavior of the congestion control protocol in response to dropped packets and packets marked by the AQM policies, the WFQ policy 325 used and the underlying channel transmission characteristics. Nevertheless, their evolution is possible and can be traced numerically as discussed in Section V.

4) Rewards: A reward function for this agent given the state-action ($s^{(\tau)}$, $a^{(\tau)}$) is given by $r^{(\tau+1)}$ as $$r^{(\tau+1)} = \Sigma_{d=1}^D \kappa_d (C_0 w_{n,d}^{(\tau)} M_n^{(\tau)} - C_1 \max\{|v_{n,d}^{(\tau)}|, k_0 \Delta_{n,d}\} - C_2 \lambda_{n,d}^{(\tau)}) \quad (4)$$

where $C_0$, $C_1$, $C_2$, $\{k_d\}_{d=1}^D$ and $k_0$ are positive tuning parameters. Parameter $\kappa_d$ captures the user-defined priority assigned to the traffic in $Q_{n,d}$. If the traffic in $Q_{n,d}$ is deemed to have higher priority than the traffic in $Q_{n,d'}$, then it must hold that $\kappa_d > k_d'$. The reward function in (4) rewards the agent with a sum of queue-specific scores weighted by the user priority assigned to the corresponding network traffic. Each queue-specific score rewards the agent by the number of packets dequeued in the last decision epoch scaled by $C_0$, and penalizes the agent by its mean delay violations capped at $k_0 \Delta_{n,d}$, scaled by $C_1$, and by the number of packets marked by the CoDel policy scaled by $C_2$. Note that for a finite-length interval [$\tau$, $\tau$+1) the reward in (4) is bounded.

As described in the previous section an agent is an entity that has agency over the environment, that is, its actions influence the environment as it transitions from one state to another. Within an RL framework, the agent seeks to learn a policy $\pi$: S→A that maps the observed state of the environment s∈ S into an action a∈ A. In one case, the policy $\pi$ defines the behavior of the WFQ policy at each node via the WFQ-weights chosen by the agent. Typically, reinforcement learning seeks the policy that maximizes the expected sum of rewards given by $$\max_{\pi \in \Pi} \mathbb{E}_\pi \left[ \sum_{t=0}^\infty \gamma^\tau r(s^\tau, a^\tau) \right] \quad (5)$$

where $\gamma \in (0, 1)$ is a discount factor, $\Pi$ defines the set of feasible policies $\pi$, and the expectation $\mathbb{E}_\pi$ is taken over the state-action marginal of the (s, a) trajectory induced by a policy $\pi$. In one embodiment of our invention, an algorithm for solving (5) is able to graciously deal with the high dimensionality of S, the continuous nature of A, the need for good sample efficiency and the sensitivity to tuning parameters. These criteria motivated the selection of SAC as the DRL algorithm used to learn the WFQ policy used by our agents. SAC is a policy gradient method that seeks to learn a stochastic policy $\pi$(a|s) by maximizing the entropy-regularized long-term reward $$\max_{\pi \in \Pi} \mathbb{E}_\pi \left[ \sum_{t=0}^\infty \gamma^\tau r(s^\tau, a^\tau) + \alpha \mathcal{H}\left(\pi(\cdot|s^{(\tau)})\right) \right] \quad (6)$$

where $H(\pi(\cdot|s(\tau)))$ denotes the entropy of the actions (considered to be a random variable) defined by $\pi$(a|s), and $\alpha > 0$ is a parameter that controls level of surprise (stochasticity) embedded in $\pi$ and thus the explore-exploit tradeoff of the policy. It is possible to derive policy iteration algorithms for solving (5) by iterating between policy evaluation and policy improvement steps]. The policy evaluation step computes the soft Q-function Q: S×A→R iteratively by using the modified Bellman backup operator $T_\pi$ as:

$$T_\pi Q(s^{(\tau)}, a^{(\tau)}) := r^{(\tau+1)} + \gamma \mathbb{E}_{p_*} [V(s^{(\tau+1)})] \quad (7)$$

where the soft value function V is defined as:

$$V(s^{(\tau)}) = \mathbb{E}_\pi [Q(s^{(\tau)}, a^{(\tau)}) - \log \pi(a^{(\tau)}|s^{(\tau)})] \quad (8)$$

and the expectation in (7) is taken over the marginal distribution of the family of probabilities defined in (2). The policy improvement step updates the policy as:

$$\pi = \arg\min_{\pi' \in \Pi} D_{KL}\left(\pi'(\cdot|s^{(\tau)}) \left\| \frac{\exp(Q(s^{(\tau)}, \cdot))}{Z(s^{(\tau)})} \right.\right) \quad (9)$$

where $D_{KL}$ denotes the Kullback-Leibler divergence, and Z is a partition function that normalizes the exponential distribution defined via Q. In practice, the example algorithm defined by (7)-(9) can only be solved efficiently for the case where S and A are discrete and have finite, small size. SAC utilizes deep neural networks to approximate the value function and the policy, and it is, thus, able to handle continuous S and A domains. As an actor-critic algorithm, SAC uses an actor network which approximates the current policy $\pi$, and the critic network which approximates the soft expected reward when choosing a∈ A while in s∈ S and following $\pi$ thereafter. Practical implementations of SAC use deep neural networks to develop estimators for both the value function and the Q-function to stabilize the training phase. Furthermore, they train independent estimators for the Q-function to mitigate policy positivity bias during the policy improvement phase. Rather than fully solving the policy evaluation and policy improvement steps, SAC performs a stochastic gradient update on the parameters of each network using off-policy data available via a replay buffer. Then, utilizes the current policy to collect experience from the environment.

Accordingly, this disclosure comprises a queue management policy that dynamically allocates bandwidth among different traffic types. The policy further comprises a deep reinforcement learning framework that comprised user-defined traffic prioritization, queueing-delay requirements, and the history of queue occupancy levels. More specifically, this disclosure may include an AQM algorithm to identify congestion for individual traffic types via the queuing sojourn time experienced by the packets. In one embodiment, the agent learning the queue management policy was trained via the SAC algorithm. This example policy showed better performance than that achieved by the static and dynamic policies used as baselines for the selection of the WFQ coefficients.

From the above description of Reinforcement-Learning Based Queue-Management Method for Undersea Networks, it is manifest that various techniques may be used for implementing the concepts of computer-implemented method to actively manage dynamic networks without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that computer-implemented method to actively manage dynamic networks are not limited to the particular embodiments described herein, but is capable of many embodiments without departing from the scope of the claims.

What is claimed:

1. A computer-implemented method to shape traffic in a dynamic network, comprising:
    measuring network states comprising
        a queue-size history,
        a measure of QoS mapped to a queue status metric,
        a measure of congestion, and
        an available transmission bandwidth;
    classifying each of a plurality of packets into one of a plurality of traffic types based on quality-of-service (QoS) requirements;
    defining a decision epoch interval;
    determining a policy with a plurality of neural networks and with a deep reinforcement learning agent that maximizes entropy-regularized long-term reward and produces a plurality of weighted fair-queuing (WFQ) weights based on an observation of the state of the queues at the decision epoch intervals; and
    using the policy to allocate predefined portions of the available transmission bandwidth across the plurality of traffic types by defining each type with a WFQ weight.

2. The computer-implemented method to actively manage dynamic networks of claim 1, further comprising:
    continuously balancing the policy at successive decision epoch intervals.

3. The computer-implemented method to actively manage dynamic networks of claim 1, wherein the network is an underwater acoustic network comprising a plurality of routing nodes.

4. The computer-implemented method to actively manage dynamic networks of claim 1, wherein the deep reinforcement learning agent utilizes a soft actor-critic learning algorithm.

5. The computer-implemented method to actively manage dynamic networks of claim 1, wherein the deep reinforcement learning agent comprises a expectation ($E\pi$), a time interval ($\tau$), a plurality of feasible policies ($\pi$), a set of feasible policies ($\Pi$), a discount factor ($\gamma$), a reward (r), a trajectory (s, a), an entropy of the actions $H(\pi(\cdot|s(\tau)))$, and a parameter controlling the level of surprise ($\alpha>0$), wherein the deep reinforcement learning agent maximizes rewards according to a following equation:

$$\max_{\pi \in \Pi} \mathbb{E}_\pi \left[ \sum_{t=0}^{\infty} \gamma^\tau r(s^\tau, a^\tau) + \alpha \mathcal{H}\left(\pi(\cdot|S^{(\tau)})\right) \right].$$

6. The computer-implemented method to actively manage dynamic networks of claim 1, wherein the reward (r) function for the deep reinforcement learning agent comprises a time interval ($\tau$), a user-defined priority ($k_d$), a $C_0$ tuning parameter for a number of packets dequeued ($C_0$), a plurality of weights (w), a packet arrival time variable (M), a $C_1$ tuning parameter for penalizing the agent by its mean delay violations ($C_1$) having a cap ($k_0 \Delta_{n,d}$), a plurality of violations (v), a $C_2$ tuning parameter for the number of packets marked by a CoDel policy ($C_2$), a counter that tracks the number of packets marked by the CoDel policy ($\lambda$), wherein the reward function is determined by an equation:

$$r^{(\tau+1)} = \Sigma_{d=1}^D \kappa_d (C_0 w_{n,d}^{(\tau)} M_n^{(\tau)} - C_1 \max\{|v_{n,d}^{(\tau)}|, k_0\Delta_{n,d}\} - C_2 \lambda_{n,d}^{(\tau)}).$$

7. The computer-implemented method to actively manage dynamic networks of claim 3, wherein each of the plurality of nodes uses finite-size first-input first-output queue with a drop-tail base policy.

8. A non-transitory computer-readable storage medium storing instructions that are executable by at least one hardware device processor to shape traffic in a dynamic network, comprising:
    measuring network states comprising
        a queue-size history,
        a measure of QoS mapped to a queue status metric,
        a measure of congestion, and
        an available transmission bandwidth;
    classifying each of a plurality of packets into one of a plurality traffic types based on quality-of-service (QoS) requirements;
    determining a policy with a plurality of neural networks and with a deep reinforcement learning agent that maximizes entropy-regularized long-term reward and produces a plurality of weighted fair-queuing (WFQ) weights based on an observation of the state of the queues at the decision epoch intervals; and
    using the policy to allocate predefined portions of the available transmission bandwidth across the plurality of traffic types by defining each type with a WFQ weight.

9. The non-transitory computer-readable storage medium storing instructions that are executable by at least one hardware device processor to shape traffic in a dynamic network of claim 8, further comprising:
    continuously balancing the policy at successive decision epoch intervals.

10. The non-transitory computer-readable storage medium storing instructions that are executable by at least one hardware device processor to shape traffic in a dynamic network of claim 8, wherein the network is an underwater acoustic network comprising a plurality of nodes.

11. The non-transitory computer-readable storage medium storing instructions that are executable by at least one hardware device processor to shape traffic in a dynamic network of claim 8, wherein the deep reinforcement learning agent utilizes a soft actor-critic algorithm.

12. The non-transitory computer-readable storage medium storing instructions that are executable by at least one hardware device processor to shape traffic in a dynamic network of claim 8, wherein the deep reinforcement learning agent comprises a expectation (E$\pi$), a time interval ($\tau$), a plurality of feasible policies ($\pi$), a set of feasible policies ($\Pi$), a discount factor ($\gamma$), a reward (r), a trajectory (s, a), an entropy of the actions H($\pi(\cdot|(\tau)$ )), and a parameter controlling the level of surprise ($\alpha$>0), wherein the deep reinforcement learning agent maximizes rewards according to a following equation:

$$\max_{\pi \in \Pi} \mathbb{E}_\pi \left[ \sum_{t=0}^{\infty} \gamma^\tau r(s^\tau, a^\tau) + \alpha \mathcal{H}\left(\pi(\cdot|S^{(\tau)})\right) \right].$$

13. The non-transitory computer-readable storage medium storing instructions that are executable by at least one hardware device processor to shape traffic in a dynamic network of claim 8, wherein the reward (r) function for the deep reinforcement learning agent comprises a time interval ($\tau$), a user-defined priority ($k_d$), a $C_0$ tuning parameter for a number of packets dequeued ($C_0$), a plurality of weights (w), a packet arrival time variable (M), a $C_1$ tuning parameter for penalizing the agent by its mean delay violations ($C_1$) having a cap ($k_0\Delta_{n,d}$), a plurality of violations (v), a $C_2$ tuning parameter for the number of packets marked by a CoDel policy ($C_2$), a counter that tracks the number of packets marked by the CoDel policy ($\kappa$), wherein the reward function is determined by an equation:

$$r^{(\tau+1)} = \Sigma_{d=1}^D \kappa_d (C_0 w_{n,d}^{(\tau)} M_n^{(\tau)} - C_1 \quad \max\{|v_{n,d}^{(\tau)}|, k_0 \Delta_{n,d}\} - C_2 \lambda_{n,d}^{(\tau)}).$$

14. The non-transitory computer-readable storage medium storing instructions that are executable by at least one hardware device processor to shape traffic in a dynamic network of claim 10, wherein each of the plurality of nodes uses finite-size first-input first-output queue with a drop-tail base policy.

15. A routing node, comprising:
a plurality of software applications,
a transport layer further comprising a congestion control;
a network layer, further comprising:
  a router configured to receive a plurality of packets for transmission,
  a packet classifier configured to assign each of the plurality of packets to one of a plurality of queues,
  the plurality of queues configured to run an active queue management (AQM) policy, wherein the AQM assigns weights to each of the plurality of packets to accommodate quality of service and dynamic network requirements,
  a weighted fair-queuing (WFQ) policy configured to select packets to transmit to a data link layer, wherein the WFQ policy is formed with a plurality of neural networks and with a deep reinforcement learning agent, wherein the deep reinforcement learning agent utilizes a soft actor-critic algorithm, to allocate predefined portions of the available transmission bandwidth across the plurality of traffic types by defining each type with a WFQ weight, and
  a plurality of Control Delay policies configured to drop a plurality of packets to control congestion;
a data link layer configured to receiving outgoing traffic; and
a physical layer configured to transmit outgoing traffic and receive incoming traffic.

16. The routing node claim 15, wherein the network is an underwater acoustic network.

17. The routing node of claim 15, wherein the deep reinforcement learning agent comprises a expectation (E$\pi$), a time interval ($\tau$), a plurality of feasible policies ($\pi$), a set of feasible policies ($\Pi$), a discount factor ($\gamma$), a reward (r), a trajectory (s, a), an entropy of the actions H($\pi(\cdot|s\,(\tau)$ )), and a parameter controlling the level of surprise ($\alpha$>0), wherein the deep reinforcement learning agent maximizes rewards according to a following equation:

$$r^{(\tau+1)} = \Sigma_{d=1}^D \kappa_d (C_0 w_{n,d}^{(\tau)} M_n^{(\tau)} - C_1 \quad \max\{|v_{n,d}^{(\tau)}|, k_0 \Delta_{n,d}\} - C_2 \lambda_{n,d}^{(\tau)}).$$

18. The routing node of claim 15, wherein the reward (r) function for the deep reinforcement learning agent comprises a time interval ($\tau$), a user-defined priority ($k_d$), a $C_0$ tuning parameter for a number of packets dequeued ($C_0$), a plurality of weights (w), a packet arrival time variable (M), a $C_1$ tuning parameter for penalizing the agent by its mean delay violations ($C_1$) having a cap ($k_0\Delta_{n,d}$), a plurality of violations (v), a $C_2$ tuning parameter for the number of packets marked by a CoDel policy ($C_2$), a counter that tracks the number of packets marked by the CoDel policy ($\kappa$), wherein the reward function is determined by an equation:

$$\max_{\pi \in \Pi} \mathbb{E}_\pi \left[ \sum_{t=0}^{\infty} \gamma^\tau r(s^\tau, a^\tau) + \alpha \mathcal{H}\left(\pi(\cdot|S^{(\tau)})\right) \right].$$

19. The routing node of claim 15, wherein each of the plurality of queues uses a finite-size first-input first-output queue.

* * * * *